(12) United States Patent
Villemain

(10) Patent No.: US 11,772,825 B2
(45) Date of Patent: Oct. 3, 2023

(54) DEPLOYABLE SATELLITE MAST

(71) Applicant: ARIANEGROUP SAS, Paris (FR)

(72) Inventor: Alexis Villemain, Saint Medard en Jalles (FR)

(73) Assignee: ARIANEGROUP SAS, Paris (FR)

( * ) Notice: Subject to any disclaimer, the term of this patent is extended or adjusted under 35 U.S.C. 154(b) by 519 days.

(21) Appl. No.: 16/652,893

(22) PCT Filed: Oct. 1, 2018

(86) PCT No.: PCT/EP2018/076664
§ 371 (c)(1),
(2) Date: Apr. 1, 2020

(87) PCT Pub. No.: WO2019/068649
PCT Pub. Date: Apr. 11, 2019

(65) Prior Publication Data
US 2020/0247564 A1    Aug. 6, 2020

(30) Foreign Application Priority Data

Oct. 4, 2017  (FR) ...................................... 1759266

(51) Int. Cl.
*B64G 1/22* (2006.01)
*B64G 1/44* (2006.01)
(Continued)

(52) U.S. Cl.
CPC ............... *B64G 1/222* (2013.01); *B64G 1/44* (2013.01); *B64G 2001/224* (2013.01); *H01Q 1/081* (2013.01); *H01Q 1/288* (2013.01)

(58) Field of Classification Search
CPC .... B64G 1/222; B64G 1/44; B64G 2001/224; B64G 1/62; B64G 1/22; H01Q 1/081; H01Q 1/288
See application file for complete search history.

(56) References Cited

U.S. PATENT DOCUMENTS 370,833 A * 10/1887 Van Order ................ E06C 5/28
    182/69.5
418,827 A *  1/1890 St. Marie .............. E04B 1/3441
    52/109
(Continued)

FOREIGN PATENT DOCUMENTS

FR    2876983 A1    4/2006
FR    2877315 A1    5/2006
(Continued)

OTHER PUBLICATIONS

Lefevre, Y.M. et al. "Design solutions for inflatable space structures" IN: Congress of the International Astronautical Federation; 2003, XP001207789.
(Continued)

*Primary Examiner* — Medhat Badawi
(74) *Attorney, Agent, or Firm* — Pearne & Gordon LLP

(57) ABSTRACT

A deployable satellite mast consisting of an inflatable tube, which is stored in fan-fold form before deployment and can be deployed by filling the tube with a gas, and which comprises a device for reinforcing and facilitating the deployment of the mast, which device is external to the mast and comprises one or more stays, first ends of which are wound on a reel device and second ends of which are secured to the tube, with the stays unwinding from the reel when the mast is deployed.

9 Claims, 4 Drawing Sheets

(51) Int. Cl.
*H01Q 1/08* (2006.01)
*H01Q 1/28* (2006.01)

(56) References Cited

U.S. PATENT DOCUMENTS

| | | | | |
|---|---|---|---|---|
| 797,077 | A * | 8/1905 | Shaw | B66F 3/22 |
| | | | | 52/109 |
| 1,003,967 | A * | 9/1911 | Magliocca | A62C 31/24 |
| | | | | 182/69.5 |
| 1,078,759 | A * | 11/1913 | Wichertjes | E04G 1/22 |
| | | | | 52/109 |
| 1,113,158 | A * | 10/1914 | Hale | E04G 1/22 |
| | | | | 52/109 |
| 1,708,113 | A * | 4/1929 | Allen | E06C 5/28 |
| | | | | 105/238.1 |
| 2,363,784 | A * | 11/1944 | Gerich | B66F 7/0666 |
| | | | | 182/141 |
| 3,496,687 | A * | 2/1970 | Greenberg | E01D 15/124 |
| | | | | 343/915 |
| 3,588,050 | A * | 6/1971 | Black et al. | E04H 12/34 |
| | | | | 254/387 |
| 3,606,719 | A * | 9/1971 | Berry | E04B 1/3445 |
| | | | | 52/632 |
| 4,337,560 | A * | 7/1982 | Slysh | E04H 12/182 |
| | | | | 343/915 |
| 4,480,415 | A * | 11/1984 | Truss | B64G 99/00 |
| | | | | 52/645 |
| 5,228,644 | A * | 7/1993 | Garriott | B64G 1/443 |
| | | | | 244/172.6 |
| 5,857,648 | A * | 1/1999 | Dailey | B64G 1/22 |
| | | | | 244/172.6 |
| 6,928,774 | B1 * | 8/2005 | Weiss | B66C 13/005 |
| | | | | 52/114 |
| 7,694,465 | B2 * | 4/2010 | Pryor | E04C 3/291 |
| | | | | 138/119 |
| 7,694,486 | B2 * | 4/2010 | Murphy | E04C 3/005 |
| | | | | 52/645 |
| 7,762,500 | B1 * | 7/2010 | Dhall | B64C 39/12 |
| | | | | 244/45 R |
| 7,806,370 | B2 * | 10/2010 | Beidleman | B64G 1/222 |
| | | | | 244/172.6 |
| 8,066,227 | B2 * | 11/2011 | Keller | H02S 10/40 |
| | | | | 244/172.6 |
| 8,387,921 | B2 * | 3/2013 | Taylor | B64G 1/443 |
| | | | | 244/172.6 |
| 8,616,502 | B1 * | 12/2013 | Stribling | B64G 1/222 |
| | | | | 244/172.6 |
| 8,905,357 | B1 * | 12/2014 | Harvey | B64G 1/244 |
| | | | | 244/172.6 |
| 9,168,659 | B2 * | 10/2015 | Doggett | B25J 18/00 |
| 9,281,569 | B2 * | 3/2016 | Taylor | H01Q 1/288 |
| 9,550,584 | B1 * | 1/2017 | Harvey | B64G 1/222 |
| 10,569,415 | B2 * | 2/2020 | Doggett | B25J 9/1045 |
| 11,223,111 | B2 * | 1/2022 | Taylor | H01Q 1/1235 |
| 11,319,093 | B2 * | 5/2022 | Rose | B64G 1/66 |
| 11,411,318 | B2 * | 8/2022 | Taylor | H01Q 19/17 |
| 2004/0046085 | A1 * | 3/2004 | Veal | B64G 1/222 |
| | | | | 244/172.6 |
| 2004/0194397 | A1 * | 10/2004 | Brown | B64G 99/00 |
| | | | | 52/108 |
| 2009/0200427 | A1 * | 8/2009 | Lacour | B64G 1/222 |
| | | | | 244/158.3 |
| 2009/0260301 | A1 * | 10/2009 | Prueitt | F03D 9/37 |
| | | | | 52/2.26 |
| 2016/0304220 | A1 * | 10/2016 | Cecchini | B64G 1/222 |
| 2020/0247564 | A1 * | 8/2020 | Villemain | B64G 1/22 |
| 2023/0166872 | A1 * | 6/2023 | Keune | B64G 1/401 |
| | | | | 244/159.1 |

FOREIGN PATENT DOCUMENTS

| | | |
|---|---|---|
| FR | 3032183 A1 | 8/2016 |
| JP | H03197300 A | 8/1991 |
| WO | 2006136675 A1 | 12/2006 |

OTHER PUBLICATIONS

Search Report for French application No. 1759266 dated May 29, 2018.

International Search Report for PCT/EP2018/076664 dated Nov. 12, 2018.

Written Opinion for PCT/EP2018/076664 dated Nov. 12, 2018.

* cited by examiner

DEPLOYABLE SATELLITE MAST

CROSS-REFERENCE TO RELATED APPLICATIONS

This is a National Stage application of PCT international application PCT/EP2018/076664, filed on Oct. 1, 2018, which claims the priority of French Patent Application No. 1759266, filed Oct. 4, 2017, both of which are incorporated herein by reference in their entirety.

FIELD OF THE INVENTION

The present invention relates to structure supports for satellites of the inflation-deployable mast type.

TECHNOLOGICAL BACKGROUND

A type of inflation-deployable masts is known in the space field. This mast is an accordion folded inflatable tube according to a tetragonal pattern before deployment and with a cylindrical shape after deployment. Such a mast supports a structure which is deployed when the satellite is in place and can be rigidified after inflation as described in document FR 2876983 A1.

Its deployment can be further controlled by an inner structure as described in document FR 2877315 A1.

Such masts can be made from metal films, from composites and are unfolded by means of the increase in pressure of a gas injected at the base thereof. Pressure pushes against the upper face of the tube and enables the mast to become longer until it achieves a cylindrical shape.

They can be used in particular to carry structures such as sail-forming panels, for example deorbiting-assist panels as described in document FR 3032183 A1.

BRIEF DESCRIPTION OF THE INVENTION

The present invention lies in the scope of the production of a support mast for large structures such as solar panels. Solar panels of satellites have to provide a significant light collection area resulting in significant stresses at a mast bearing them. Such a mast has therefore to be rigidified and its deployment better controlled especially to ensure a proper uniform deployment of solar panels.

Within this scope, the present invention provides a deployable mast for a satellite consisting in an accordion stored inflatable tube before deployment and deployable by filling the tube by means of a gas, characterised in that it includes a rigidification and deployment-assist device external to the mast, said device including one or more stays wound on a reel device at a first one of their ends and attached to the tube at a second one of their ends, said stays unwinding from the reel upon deploying the mast.

The rigidification device can especially comprise at least one pair of stays disposed at 180° relative to the mast axis.

According to a first embodiment, the stays of the pair of stays are wound on a single reel device.

According to an alternative embodiment, the reel device includes a reel per stay.

In this case, the reels of a pair of stays can in particular be synchronised by a connecting cable arranged to unwind from the first one of the reels and wind in opposition on a second one of the reels during unwinding of the stays.

Advantageously, at least some of the stays are fastened to the free end of the tube becoming the apex of the mast after deployment.

Alternatively or complementarily, at least some of the stays are fastened to an intermediate part of the tube.

The rigidification device can comprise at least two pairs of stays disposed in planes intersecting at the mast axis and forming a non-zero angle to each other.

According to a particular embodiment, the stay(s) is or are ropes a composition of which comprises polymers solidifying by UV irradiation or ropes that are rigidifiable by Joule effect polymerisation.

The reel(s) can further include a brake device for keeping stays tensioned upon deploying the mast.

Advantageously, at the base of the mast, stays can be held spaced from the mast by arms formed by fixed beams or foldable rods perpendicular or tilted relative to the mast.

According to one particular embodiment, at least one spring is disposed either at the top of the stays or at the end of the stay on the reel side or on both sides.

Advantageously, flexible tabs perforated at the middle thereof for passing the cable can surround a cable in the mast.

BRIEF DESCRIPTION OF THE DRAWINGS

Further characteristics and advantages of the invention will appear upon reading the following description of non-limiting exemplary embodiments of the invention with reference to the drawings which represent.

DETAILED DESCRIPTION OF EMBODIMENTS OF THE INVENTION

The present invention is concerned with structures which can be deployed on a satellite such as for example a structure which can in particular support solar panels and adapted to withstand stresses and strains created by these panels such as stresses and strains created by the thermal environment and motions of the satellite. It fulfils technical needs which are assisting in guiding the mast during its deployment and bringing stiffness to the mast after deployment.

Figure 1:
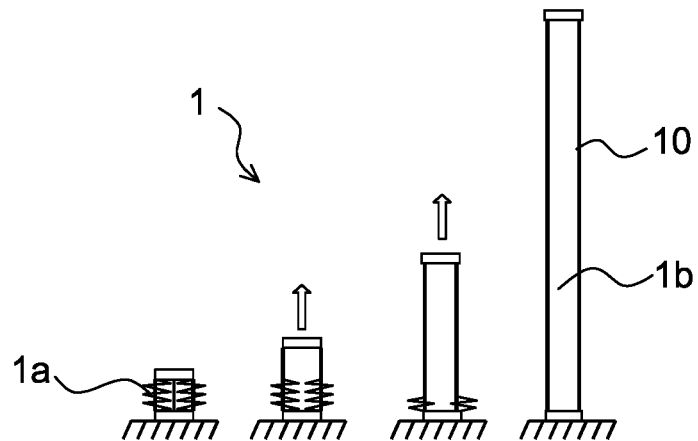
in FIG. 1, a schematic representation of a mast deployment of prior art.

The invention relates to a deployable mast 1 such as depicted in FIG. 1 and mainly consisting of an inflatable tube 10, stored in an accordion shape 1a before deployment, and deployable by filling the tube by means of a gas according to a sequence such as represented, the deployed tube 1b forming a carrying structure.

Figure 2A:
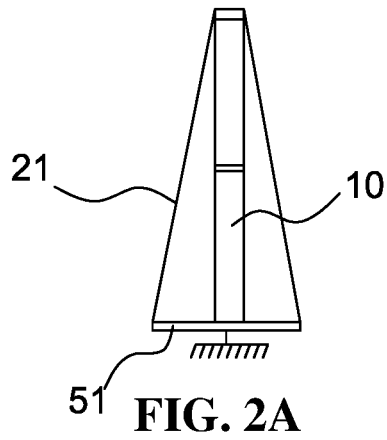
in FIGS. 2A-2D, schematic examples in a side view of embodiments of masts according to the invention.
Figure 2B:
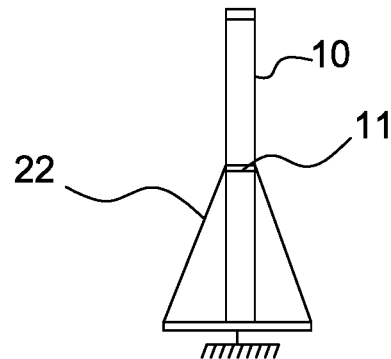
Figure 2C:
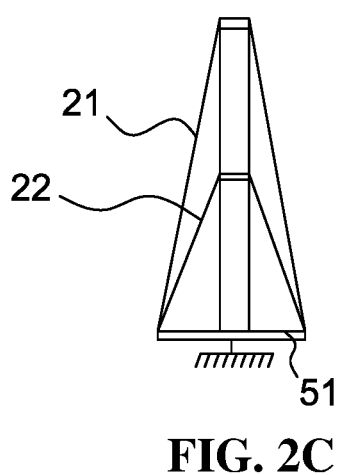

To assist in deploying the tube and rigidify it, the invention provides stays external to the tube as represented in FIGS. 2A to 2C.

Stays are flexible structures of the cable or wire type which can be made from different materials: metal, composite, polymers, etc.

FIG. 2A represents a deployed mast provided with a pair of stays 21 which are fastened to the free end of the tube 10 becoming the apex of the mast after deployment.

FIG. 2B represents a deployed mast including a pair of stays 22 fastened to the intermediate part of the deployed tube.

FIG. 2C represents a deployed mast including two pairs of stays 21, 22. A pair of stays 21 is fastened at the top of the mast and a pair of stays 22 is fastened to the intermediate part of the deployed tube.

Figure 2D:
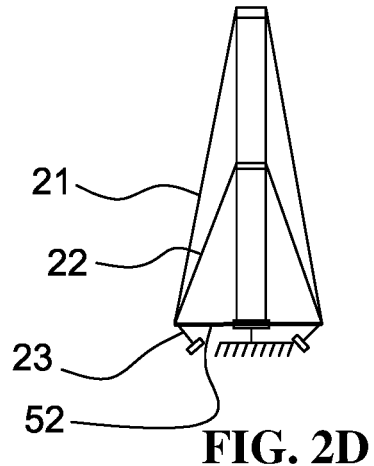

In the example of FIGS. 2A to 2C, the bottom part of the stays is fastened at a distance from the mast to fixed beams 51. In the example of FIG. 2D, the lower part of the stays is held spaced from the mast by foldable rods 52 possibly perpendicular to the mast and lower strands 23 of the stays are used to tension stays.

Figure 4A:
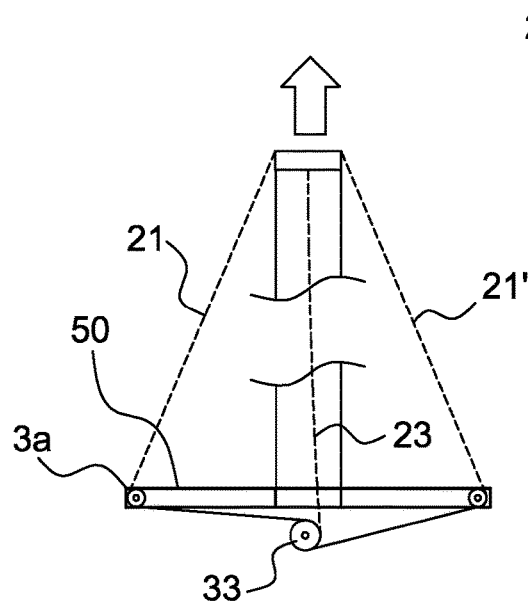
in FIGS. 4A-4C, exemplary embodiments of reel means of the invention.
Figure 4B:
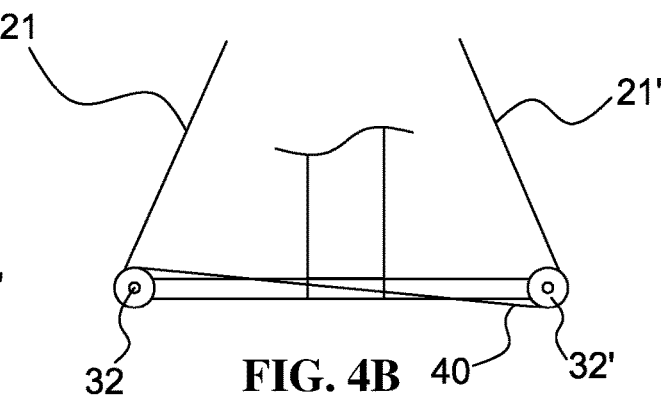
Figure 4C:
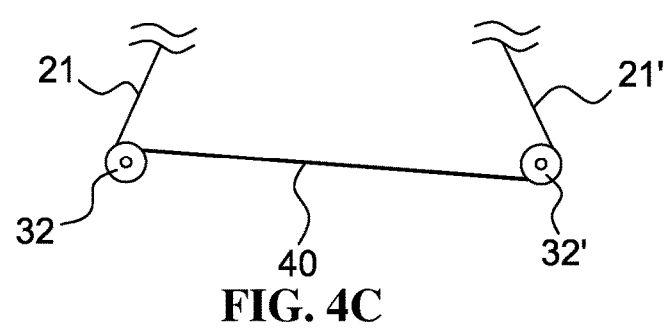

The rigidification and deployment-assist device external to the mast of the invention includes, according to FIGS. 4A to 4C, reels on which the stays are wound when the tube is stored folded and from which the stays are unwound upon deploying the mast.

Figure 5:
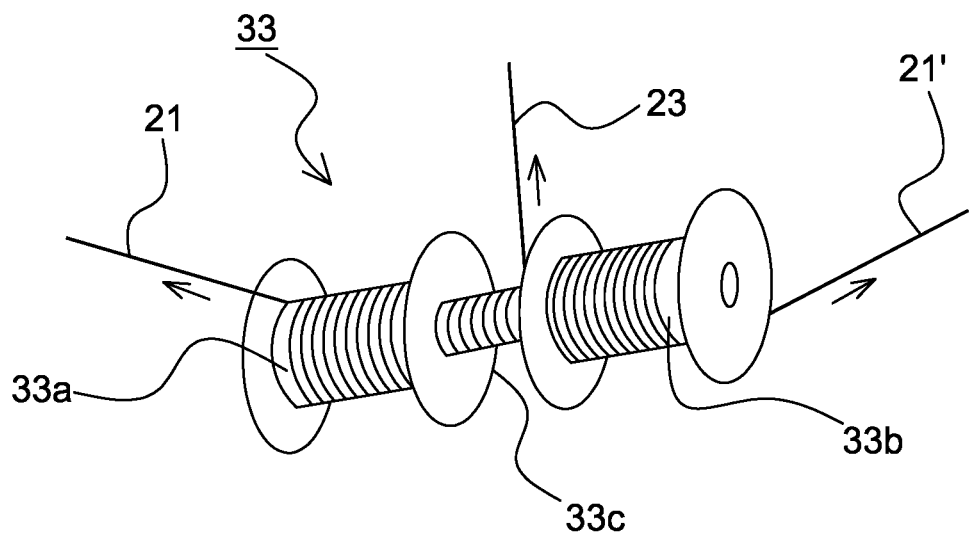
in FIGS. 5, 6 and 7, perspective views of reels applicable to the invention.

In the example of FIG. 4A, a single reel 33 receives two stays 21, 21' of a pair of coplanar stays on winding cylinders or bobbins 33a, 33b with opposite winding directions and pulleys 3a at the end of beams 50 guide the stays. The reel is for example such as represented in FIG. 5. This reel is a triple reel which includes a first winding cylinder 33a for a first stay of a pair of stays, a second winding cylinder 33b for a second stay of the pair of stays and, in this embodiment, a third cylinder 33c receiving a cable internal to the tube and attached to the free end of the tube and used to control uncoiling of stays during deployment of the mast, the free end of the tube pulling on the inner cable. In this configuration, the diameter of cylinders is adapted so that unwinding stays is synchronised with deploying the mast.

Figure 6:
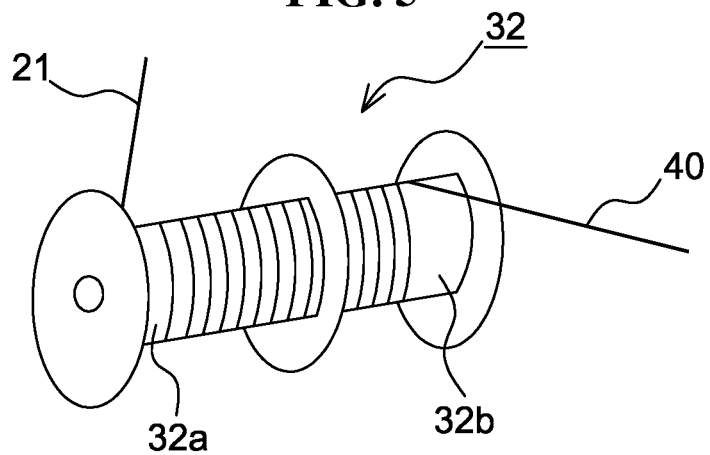

In the example of FIG. 4B, each stay of the pair of stays includes a contrarotating reel 32, 32'. These reels are synchronised by a connecting cable 40 connecting them which is more particularly represented in FIG. 4C. This connecting cable 40 is unwound from a first winding cylinder or bobbin on a first reel, for example the reel 32 and is wound on a second winding cylinder or bobbin on the second reel, for the reel 32' upon deploying the mast. In this case, the reels are made according to the example of FIG. 6. They include a first winding cylinder 32a receiving the stay 21, a second winding cylinder receiving the connecting cable 40.

Figure 7:
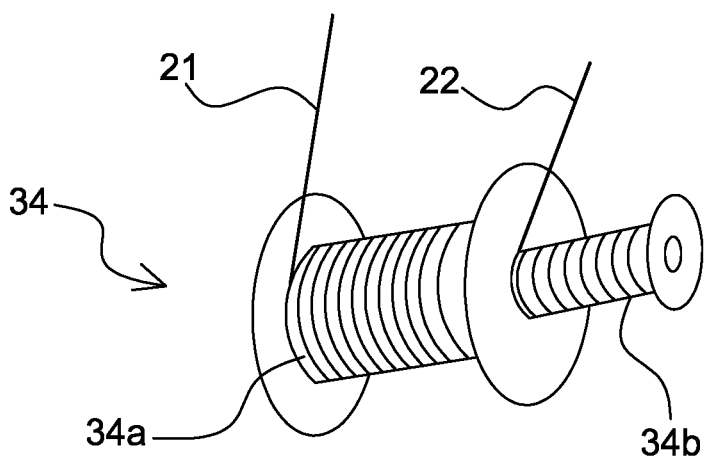

The reel represented in FIG. 7 is an exemplary reel receiving a head stay 21 and a stay 22 attaching to an intermediate part of the mast. In this case the ratio of diameters of the winding cylinders receiving the stays is adapted to keep an identical tension for these stays upon deploying the mast.

The stays can be flexible cables of different materials, metal, composite, polymers, etc. or rigidifiable ropes such as rigidifiable ropes by Joule effect polymerisation after flowing an electric current into the rope. Another embodiment can use stays including a UV polymerisable material. In the latter case, once unwound and subjected to the sun UV irradiation, the stays can rigidify and even better contribute to hold the mast erected.

Still for the purpose of controlling the deployment of the mast, the reel(s) can include a brake device for keeping the stays tensioned during deployment of the mast.

Figure 3A:
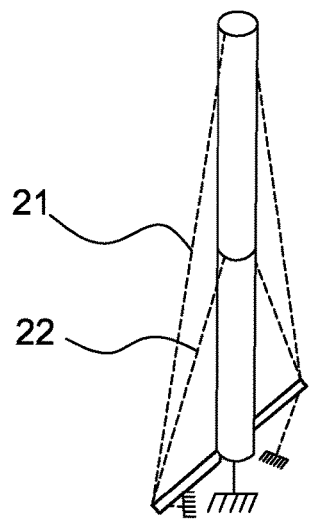
in FIGS. 3A-3B, perspective views of exemplary embodiments of the invention.

FIG. 3A describes in a perspective view an embodiment with two pairs of coplanar stays disposed at 180° relative to the mast axis.

Figure 3B:
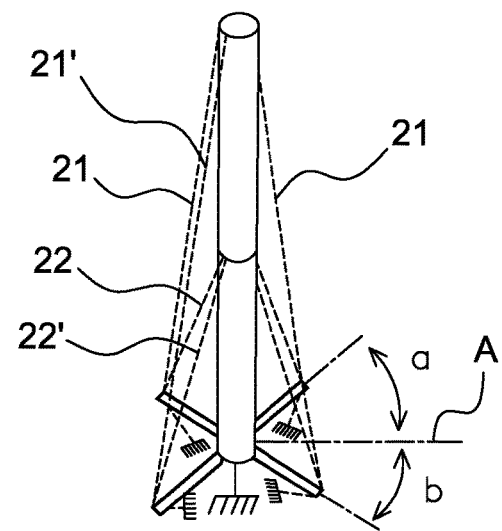

According to FIG. 3B, the rigidification device comprises four pairs of stays 21, 21', 22, 22' disposed in twos in planes intersecting at the mast axis. In the example, by taking a plane P defined by the mast and a straight line A perpendicular to the mast, in which plane for example the solar panels are, the plane including a first pair of stays fastened at the top of the mast and a first pair of stays fastened at an intermediate part of the mast, forms with a plane P an angle α whereas the plane including the second pair of stays fastened at the top of the mast and the second pair of stays fastened at an intermediate part of the mast forms an angle β with plane P.

Figure 9:
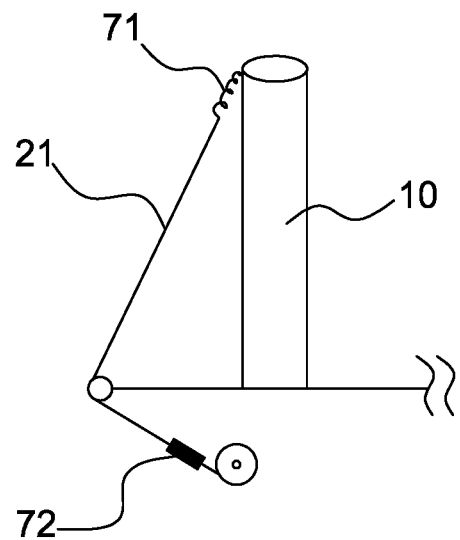

According to the example of FIG. 9, in order to absorb thermal expansions of the stays as a function of their material, elongation thermal expansions of the mast, the slake of the stay opposed to the other which would undergo a tensile warp, a slight tension is brought at the end of deployment, without hampering plastic deformation by inflation of the mast, by adding springs either at the top of the stays, as the spring 71, or at the end of the stay, as the spring 72 on the reel side, or on both sides. Springs can be of the coil spring or elastic cable type spring at the top part of the stay. However, at the bottom part of the stay, since the spring is initially wound on the reel, an elastic cable type spring then acting after complete reeling of the stays will be preferred.

Figure 8:
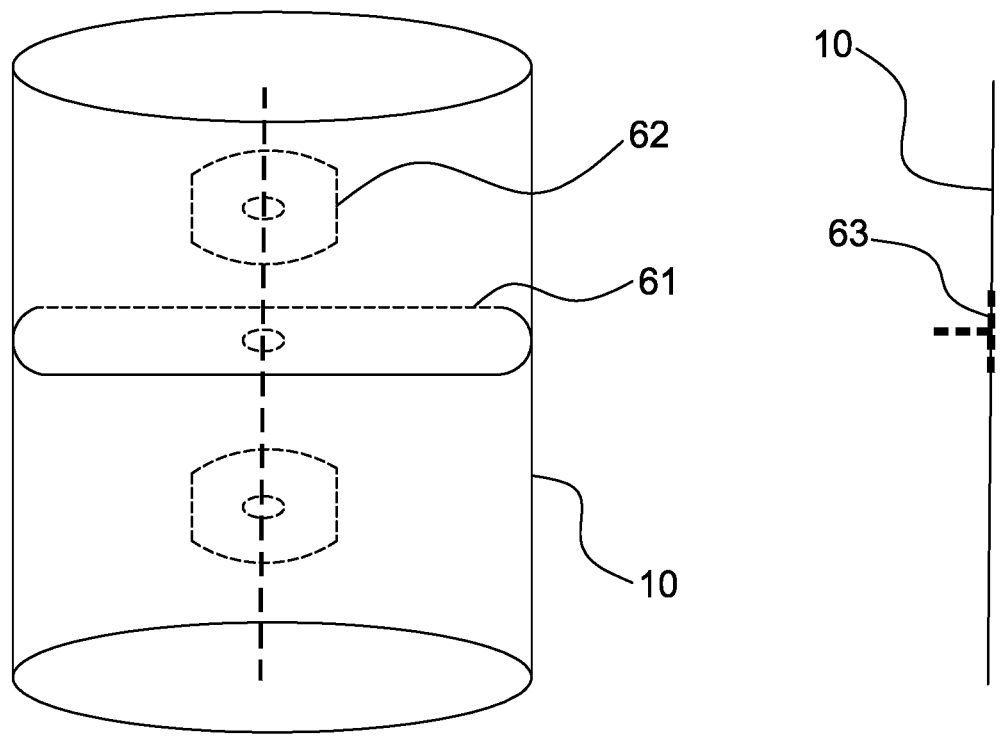
in FIG. 8, a particular exemplary embodiment of the mast; and in FIG. 9, a schematic diagram showing a further example of the mast.

In the case a central cable is positioned inside the tube a means for preventing the cable from striking the mast after deployment has to be found. In this case, it is possible to position, as represented in FIG. 8, flexible tabs 61, 62, for example made of kapton, perforated at the middle thereof for passing the cable. These tabs which surround the cable can especially be bonded between the folded parts of the mast according to mark 63.

The invention therefore provides staying the mast which brings bending and tensile stiffness to the mast after deployment and a synchronised unwinding of the stays which brings an assistance in guiding the mast upon deploying the mast.

What is claimed is:

1. A deployable mast for a satellite consisting of an inflatable tube stored in an accordion shape before deployment and deployable by filling the inflatable tube by means of a gas, the mast including a rigidification and deployment-assist device external to the mast, said device including one or more stays, each stay is wound on a reel device at a first end and attached to the inflatable tube at a second end, said stays unwinding from the reel device upon deploying the mast, wherein said one or more stays further comprise a pair of stays disposed at 180° relative to the mast axis, wherein the pair of stays are wound on a single reel device, and wherein the pair of stays each have a second respective end attached to the inflatable tube, and wherein the pair of stays are synchronized by a connecting cable unwound from a first reel of the reel device and wound in opposition from a second reel of the reel device during unwinding of the stays.

2. The deployable mast according to claim 1, wherein at least some of the stays are fastened to the free end of the inflatable tube becoming the apex of the mast after deployment.

3. The deployable mast according to claim 1, wherein at least some of the stays are fastened to an intermediate part of the inflatable tube.

4. The deployable mast according to claim 1, wherein the rigidification device comprises at least two pairs of stays disposed in planes intersecting at the mast axis.

5. The deployable mast according to claim 1, wherein the stays are ropes a composition of which comprises polymers solidifying by UV irradiation or ropes that are rigidifiable by Joule effect polymerisation.

6. The deployable mast according to claim 1, wherein the reel device includes a brake device for keeping the stays tensioned upon deploying the mast.

7. The deployable mast according to claim 1, wherein at the base of the mast, the stays are held spaced from the mast by arms formed by fixed beams or foldable rods perpendicular or tilted relative to the mast.

8. The deployable mast according to claim 1, wherein at least one spring is disposed either at the top of the stays or at the end of the stays on the reel side or on both sides.

9. The deployable mast according to claim 1, further comprising tabs, each tab is perforated at a middle of the respective tab for passing a cable in the mast surround said cable.

\* \* \* \* \*